United States Patent Office 3,598,734
Patented Aug. 10, 1971

3,598,734
HIGH TEMPERATURE GREASE
Arthur C. Borg, Chicago, Ill., and Stephen J. Zajac, Whiting, Ind., assignors to Standard Oil Company, Chicago, Ill.
No Drawing. Continuation-in-part of application Ser. No. 178,539, Mar. 9, 1962, which is a continuation-in-part of application Ser. No. 175,871, Feb. 21, 1962. This application Mar. 4, 1969, Ser. No. 804,263
Int. Cl. C10m 5/26
U.S. Cl. 252—28     6 Claims

ABSTRACT OF THE DISCLOSURE

A grease of high temperature and mechanical stability is prepared with a lubricant base thickened to grease consistency with a reaction product of an aromatic polyisocyanate and a boric acid in combination with finely divided silica.

CROSS-REFERENCE TO RELATED APPLICATION

This invention is a continuation-in-part of Borg-Zujac U.S. application Ser. No. 178,539, filed Mar. 9, 1962, and now abandoned, which in turn is a continuation-in-part of Zajac U.S. application Ser. No. 175,871, filed Feb. 21, 1962, now U.S. Pat. No. 3,166,506

BACKGROUND OF THE INVENTION

(1) Field of the invention

This invention relates to lubricant greases and more particularly to a novel thickener combination for high temperature greases.

(2) Description of the prior art

Greases possessing outstanding properties with respect to high temperature stability and mechanical stability have been prepared with a lubricant base thickened to grease consistency with a reaction product of an aromatic polyisocyanate and a boric acid. The reaction product is apparently a polymer, or perhaps a telomer, of the aromatic polyisocyanate, and contains only a few thousandths of a percent boron.

SUMMARY OF THE INVENTION

It has now been discovered, pursuant to the invention, that even superior temperature and mechanical properties may be achieved by employing as thickening agent the foregoing reaction product in combination with finely divided silica. Greases so made perform exceptionally well at temperatures of 600° F. and above.

The silicas for use herewith are finely divided oleophilic materials generally having particle sizes predominantly in the 0.005–0.020 micron range, with surface areas (BET nitrogen adsorption isotherm) of about 100–350 square meters per gram. They may be prepared by various techniques, and may be employed per se or after surface modification with alcohols or other organics to increase their oleophilicity. Various techniques of silica preparation include low-temperature precipitation from aqueous solutions of soluble silicates, high temperature (1100° C.) vapor phase hydrolysis of silicon tetrachloride, etc.

A particularly suitable silica is pyrogenic "Cab-O-Sil H-S," produced by Godfrey L. Cabot, Inc., by the aforementioned high temperature hydrolysis of SiCl₄. This material has a particle size range of about 0.005–0.010 micron, a BET surface area of 300–350 m.²/g., and is apparently sufficiently oleophylic as produced to require no surface modification.

Aromatic polyisocyanates used in preparing the other component of the thickener are those molecules containing one or more aromatic nuclei and two or more isocyanate groups; those having two isocyanate groups are preferred. Among the suitable aromatic polyisocyanates are those having a biphenylene structure as shown below:

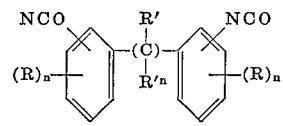

Examples of biphenylene diisocyanates are bitolylene diisocyanate (3,3'-ditolylene-4,4'-diisocyanate), diphenylmethane-4,4'-diisocyanate, 3,3'-dimethyldiphenylmethane-4,4'-diisocyanate, xenylene diisocyanate, diphenylxenylene diisocyanate, and substituted derivatives thereof such as dianisidine diisocyanate and dichloroxenylene diisocyanate. Thus in the foregoing formula $n$ is an integer of 0–4, R is an alkyl group of 1–4 carbon atoms or a phenyl group, and R' is hydrogen or an alkyl group of 1–4 carbon atoms.

Other highly desirable forms of aromatic polyisocyanate are the monophenylene diisocyanates represented by, for example, compounds within the formula below:

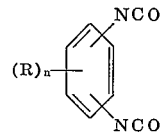

In the above formula $n$ is 0–4 and R is an alkyl group of 1–4 carbon atoms. Examples of monophenylene diisocyanates are tolylene diisocyanate (either the 65 percent 2,4 isomer and 35 percent 2,6 isomer, the 80 percent 2,4 isomer and 20 percent 2,6 isomer, or the 100 percent 2,4 isomer), meta phenylene diisocyanate, 2,4-tolylene diisocyanate dimer, and xylylene diisocyanate. Non-hydrocarbon substituted monophenylene diisocyanates include methoxyphenylene dissocyanate, phenoxyphenylene diisocyanate, and chlorophenylene diisocyanate.

Other aromatic polyisocyanates also suitable for use herewith include triphenylmethane triisocyanate, naphthalene diisocyanate, and methyl naphthalene diisocyanate.

Apparently any form of boric acid may be used. We prefer H₃BO₃, although materials which afford H₃BO₃, such as boric anhydride, HBO₂, and the various boric acid esters, e.g. MeH₂BO₃ may also be employed.

Only a small amount of a boric acid is necessary for the reaction. We have used as little as 2 percent and as much as 20 percent with substantially equivalent results being obtained in each case. Accordingly, the amount of boric acid may range from as little as 0.01 weight percent or less to as much as 50 weight percent or more, with only a slight increase in boron content of the reaction product obtained at the extreme high limit of the foregoing range.

The reaction between the aromatic polyisocyanate and the boric acid is advantageously conducted at a temperature within the range of about 100–300° F., preferably about 150–225° F., e.g. 180–210° F. An inert solvent—that is a liquid which does not deleteriously affect the reaction or reaction product—is advantageously employed; we prefer to use dimethylformamide as it is an excellent solvent for both reactants, although such diverse materials as ethyl acetate, dialkyl esters of the ethylene glycols such as dibutyl Carbitol, and even high boiling hydrocarbons appears to be useful.

In preparing the polisocyanate-boric acid component, we prefer to add the polyisocyanate, the boric acid, and the dimethylformamide to a heated vessel, which is stirred and heated to a temperature within the range of about 180–200° F. Crystals of the inventive reaction product begin to form immediately when the temperature reaches about 200° F. We maintain the foregoing temperature range for about five minutes and then cut off all heat without agitation, and permit the mixture to cool without extraneous coolants for about two hours. A mild bubbling takes place during the first hour or so.

After about two hours of cooling and crystallization, well-formed crystals are present. The mixture is then preferably mixed with water to wash the newly formed crystals, and then vacuum filtered to remove dimethylformamide and water. To assure good washing, we wash and filter several times and then dry the solids at 210–220° F.

The polyisocyanate-boric acid and silica may be added to the oleaginous lubricant vehicle at room temperature. For such addition, a sufficient quantity of each thickener, e.g. 2–20 percent by weight of the final grease, preferably about 2–10 percent, is added to the appropriate lubricant vehicle and stirred at room temperature. When the mix is uniform, it is milled and heated to about 450° F. (plus or minus about 50° F.), held there for 0.1–10 hours or so, then cooled and again roll milled or homogenized by conventional means to assure intimate dispersion of the thickeners.

Suitable lubricant vehicles are oleaginous liquid lubricant bases which can be thickened with the herein described thickeners to form greases and illustratively include the silicone polymer oils, mineral lubricating oils, synthetic hydrocarbon lubricating oils, synthetic lubricating oils such as polyalkylene glycols and their derivatives, high molecular weight esters of dicarboxylic acids, polyfluoro derivatives of organic compounds such as the trifluorovinyl chloride polymers known as "Fluorolube" and the trifluorochloroethylene polymers known as "Kel-F," and other lubricant vehicles.

The silicone polymer oils which may be employed in conjunction with the present invention are those falling substantially within the lubricating oil viscosity range, e.g. possessing a viscosity at 100° F. within the range of about 25 to about 3500 SSU. These silicone oils are polyalkyl or polyalkaryl siloxanes such as methyl siloxane or methyl phenyl siloxane. Mineral oils in the lubricating oil viscosity range, e.g. from about 50 SSU at 100° F. to about 300 SSU at 210° F., and preferably solvent extracted to substantially remove the low viscosity index constituents, are also suitable. Similarly, synthetic lubricating oils resulting from polymerization of unsaturated hydrocarbons or other oleaginous materials within the lubricating oil viscosity range such as high molecular weight polyoxyalkylene compounds typified by polyalkylene glycols and esters thereof, aliphatic diesters of dicarboxylic acids such as the butyl, hexyl, 2-ethylhexyl, decyl, lauryl, etc., esters of sebacic acid, adipic acid, azelaic acid, etc. may be thickened to produce excellent greases. Polyfluoro derivatives of organic compounds, particularly hydrocarbons, and dibasic acid esters of $H(CF_2)_nCH_2OH$, in the lubricating oil viscosity range can also be thickened. Other synthetic oils, such as esters of aliphatic carboxylic acids and polyhydric alcohol, e.g. trimethylolpropane tripelargonate and pentaerythritol hexanoate, can be used as suitable oil vehicles. Where the grease product is to be employed under high temperature conditions, e.g. above 400° F., lubricating oil vehicles which are stable, i.e. do not decompose at the temperatures to be encountered; should be used as the vehicle. For such uses, silicone polymers and diesters of dicarboxylic acids are preferred.

Various additives may be incorporated into the greases of the invention in order to improve certain specific properties thereof. For example, the silica thickener is unstable in the presence of water, and should water or excessive moisture be foreseeably encountered in use, it is desirable to add a minor amount, based on silica, of a polyalkylene oxide containing additive such as Tween 61 (Atlas Powder Company), Ucon LB-3000 (Union Carbide Chemicals Company), or Nonisol 250 (Geigy Industrial Chemicals).

The invention will be exemplified in the following examples. It is to be understood that these are for illustrative purposes only and are not to be considered wholly definitive and exclusive with respect to scope or conditions.

EXAMPLES

In this example a reaction product is prepared from bitolylene diisocyanate and boric acid in dimethylformamide. All of the isocyanate (190.4 g.), boric acid (9.6 g.), and solvent (800 cc.) are stirred and heated together at 200–220° F. for several minutes, after which both heat and agitation are withdrawn and the mixture permitted to crystallize for two hours. After three repetitions of water washing (500 cc.) and vacuum filtering, the reaction product is dried at 200–215° F.

A grease is prepared by combining at room temperature 4.0 parts by weight of the above reaction product, 4.0 parts of pyrogenic "Cab-O-Sil HS-5" silica, and 92 parts of Dow-Corning F6–7039 methyl phenyl silicone fluid. The mixture is mixed carefully, roll milled, heat treated at 450° F. for two hours, and then re-milled.

The grease is tested in comparison with a straight silica-thickened grease (made in the same manner with identical components), and with a grease thickened solely with the above reaction product, in the Modified CRC L-35-59 Bearing Performance Test at 600° F. This test involves packing an SAE No. 204 ball bearing with grease and running to failure at 10,000 r.p.m. and 600° F. The time to failure and grease penetration after failure are recorded.

|  | A | B | C |
|---|---|---|---|
| Grease composition, weight percent: |  |  |  |
| Reaction product | 4.0 | | 8.0 |
| Silica | 4.0 | 8.0 | |
| Silicone fluid | 92.0 | 92.0 | 92.0 |
| CRC L-35-59 600° F. test, hours | 104.0 | 60.0 | 93.0 |

The outstanding performance of the inventive grease is clearly manifested. While it would appear that the time to failure of the inventive grease would be within that of the straight silica thickened grease and of the grease thickened with the reaction product above, quite surprisingly, however, the contrary has been shown. The time to failure of the inventive grease has surpassed that of Grease C even though the percentage of reaction product present has been reduced by 50% and replaced by the obviously inferior silica of Grease B.

Thus it is evident that there has been prepared, in accordance with the invention, an outstanding grease thickener. It may be employed in virtually any type of lubricant base, either alone or in admixture with other lubricant additives such as antirusts, corrosion and oxidation inhibitors, etc.

Having thus described the invention what is claimed is:
1. A high temperature lubricant grease composition comprising essentially a major proportion of an oleaginous lubricant base, (a) from about 2 to 20% by weight of the reaction product obtained by reacting an aromatic polyisocyanate with from 0.01 weight percent to 50 weight percent, based on said aromatic polyisocyanate, of a boric acid at a temperature of about 100–300° F. for a period up to about two hours, and (b) from about 2 to 20% by weight of a finely divided silica, said aromatic polyisocyanate being selected from the group consisting of (1) a polyisocyanate having the general structure

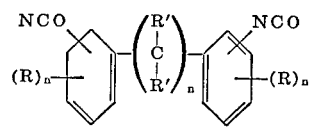

wherein R is an alkyl radical of 1 to 4 carbon atoms, R' is a substituent selected from the group consisting of hydrogen and an alkyl radical of 1 to 4 carbon atoms and $n$ is an integer 0 to 4, (2) a polyisocyanate having the general structure

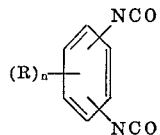

wherein R is an alkyl radical of 1 to 4 carbon atoms and $n$ is an integer 0 to 4, (3) triphenylmethane triisocyanate, (4) naphthalene diisocyanate and (5) methyl naphthalene diisocyanate.

2. The grease of claim 1 wherein said aromatic polyisocyanate is biphenylene diisocyanate.

3. The grease of claim 1 wherein said aromatic polyisocyanate is bitolylene diisocyanate.

4. The grease of claim 1 wherein said silica thickener has a particle size range of about 0.005–0.010 micron.

5. The grease of claim 1 wherein said oleaginous lubricant base is a methyl phenyl silicone fluid.

6. A high temperature lubricant grease composition comprising essentially a major proportion of a methyl phenyl silicone, (a) about 2–10 weight percent of the reaction product obtained by reacting bitolylene diisocyanate, with from 0.01 weight percent to 50 weight percent, based on said bitolyene diisocyanate, boric acid at a temperature of about 100–300° F. for a period of time up to about two hours, and (b) about 2–10 weight percent of a silica having a particle size range of about 0.005–0.010 micron.

References Cited
UNITED STATES PATENTS 3,166,506  1/1965  Zajac _____ 252—49.6
3,374,170  3/1968  Hedenburg et al. _____ 252—28

DANIEL E. WYMAN, Primary Examiner

I. VAUGHN, Assistant Examiner

U.S. Cl. X.R.

252—49.6